United States Patent [19]
Baclet et al.

[11] Patent Number: 5,417,367
[45] Date of Patent: May 23, 1995

[54] DEVICE FOR OPENING A PIPE AND AN APPLICATION OF SAID DEVICE

[75] Inventors: René Baclet, Gosnay; Bernard Nuttin, Tourcoing, both of France

[73] Assignee: Mecaplast SAM, Hereditaire Albert, Monaco

[21] Appl. No.: 120,784

[22] Filed: Sep. 15, 1993

[30] Foreign Application Priority Data

Sep. 9, 1993 [EP] European Pat. Off. ............ 93402191

[51] Int. Cl.⁶ .............................................. G05D 23/02
[52] U.S. Cl. .................................. 236/93 R; 236/101 D
[58] Field of Search ................... 236/101 D, 93 R, 13

[56] References Cited

U.S. PATENT DOCUMENTS

| | | | |
|---|---|---|---|
| 3,664,582 | 5/1972 | Jackson et al. | 236/93 R |
| 4,227,646 | 10/1980 | Hart et al. | 236/101 D X |
| 4,523,605 | 6/1985 | Ohkata | 236/101 D X |
| 4,778,104 | 10/1988 | Fisher | 236/101 D X |
| 4,932,429 | 6/1990 | Watanabe et al. | 236/101 D X |

Primary Examiner—William E. Tapolcai
Attorney, Agent, or Firm—Nixon & Vanderhye

[57] ABSTRACT

Device for controlling the opening of a blanking off flap of a pipe, wherein the blanking off flap of the pipe is controlled in a first direction by a device using a spring made of a shape memory alloy as soon as the temperature rises and a return spring which activates the flap in a direction opposite the first direction as soon as the temperature drops.

5 Claims, 2 Drawing Sheets

DEVICE FOR OPENING A PIPE AND AN APPLICATION OF SAID DEVICE

The present invention concerns a device for controlling the opening of a pipe carrying fluid or a liquid by means of a flap and the various applications of said device.

An application may be the opening of a hot air valve in an air intake device so as to adjust the temperature of suction air.

BACKGROUND OF THE INVENTION

In the prior art, there are devices able to adjust the temperature of the intake air of an internal combustion engine which may be classified into three families. One first family constituted by a thermostatic element, such as a wax capsule, is able by controlling the hot air intake flap to obtain a mixture at an average temperature of 30° C. Now, motorists want to feed the engine with fresh air under a full load and with hot air when the load is light. A second family comprising a pneumatic servomotor for controlling the temperature of the mixture according to the load of the engine is able to resolve this problem. Finally, a third family constituted by devices, such as those of the patent FR 2 367 924 associating a pneumatic servomotor with a wax thermostat, are able to adjust the temperature of the air admitted during operation under a full load when the outside temperature is extremely low.

SUMMARY OF THE INVENTION

One first object of the invention is thus to offer a device for controlling the opening of a blanking off flap of an air intake pipe, said device being simple to embody and easier to implement and produce than wax thermostats and possessing less inertia suppressing the excess travel beyond the desired maximum temperature and eliminating generally silicon-based oils or greases used in the production of the latter.

This object is attained by the fact that the blanking off flap of the pipe is controlled in a first direction by a device using a shape memory alloy spring once the temperature rises and a return spring which activates the flap in a direction opposite the first direction as soon as the temperature falls.

According to one particular characteristic of the invention, the control device comprises a rod assembly activated by the return spring and the shape memory alloy spring and which acts on the flap.

Another object of the invention is to enable the device to be used in a unit corresponding to the characteristics of the third family without having the drawbacks linked to wax thermostats.

This object is attained by the fact that a device for adjusting the air temperature comprises a pneumatic servomotor whose pressure control chamber is directly or indirectly connected to the suction pipe of an internal combustion engine, wherein the mobile element of the servomotor is rendered integral with the well of a device for controlling the opening of a flap.

BRIEF DESCRIPTION OF THE DRAWINGS

Other special characteristics and advantages of the present invention shall appear more clearly from a reading of the following description with reference to the following figures in which.

DETAILED DESCRIPTION OF THE INVENTION

Figure 1:
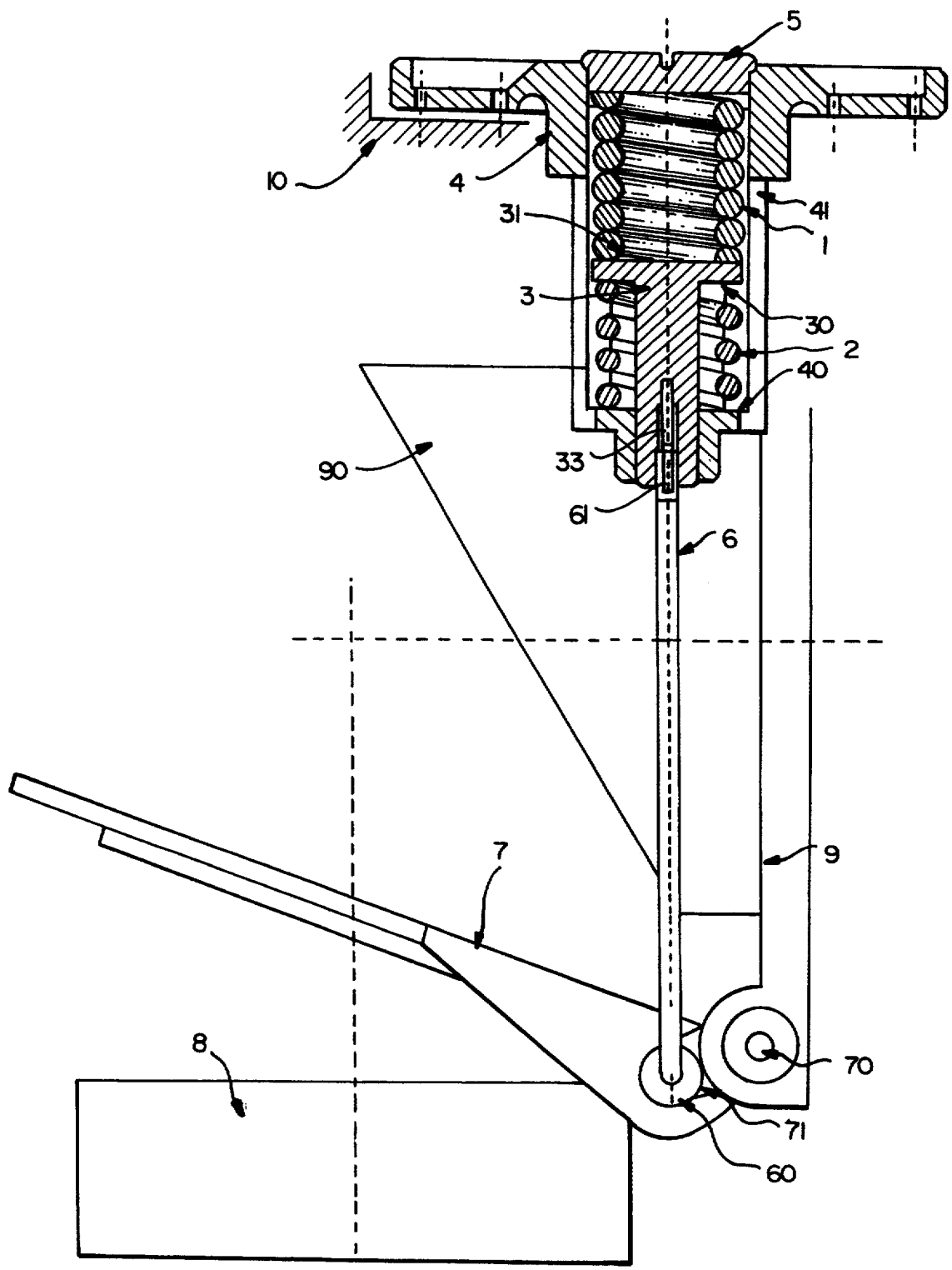
FIG. 1 shows the device of the invention.

The device of the invention is constituted by a spring (1) made of an alloy with a shape memory and placed in a well (41) so as to constitute a thermostatic element (4) which may be placed in a current of air or mixed liquid in order to open or close a hot fluid pipe (8) according to the temperature of the air or the mixed liquid, such as air. The spring (1) acts on a piston (3) provided with a tapped hole rendered integral with a threaded end (61) of a rod assembly (6) whose second end (60), by means of a lever (71), controls the pivoting of a flap (7) joined around a spindle (70) mounted on a support (9) integral with a cold fluid intake pipe (90) so as to be mixed with the hot fluid issuing from the pipe (8) so that the temperature of the mixed fluid remains between two given temperatures within a particular range. The spring (1) acts on the face (31) opposite the face (30) of the piston (3). A second spring (2) made of steel acts between the opposing face (30) of the piston (3) and the bottom (40) of a well (41). The unit constitutes the thermostatic element. The well (41) is closed at its other end by an adjustable stopper (5) (via a threading).

The operating principle of the device for opening the intake pipe is the following:

An object made of a shape memory alloy may be deformed by applying a stressing at a certain cold temperature (T1) to appear plastic and recover its initial shape by being heated above another temperature (T2), namely a hot temperature. The physical phenomenon originating from this property is a martensitic type transformation, that is, depending on the temperature, these alloys possess two different structures:

at the temperature T1, the alloy is said to be in the martensitic state, at the temperature T2, the alloy is said to be in the austenitic state.

The alloy and the size of the spring are calculated in such a way so that the passage temperature to the austenitic state corresponds to the temperature range in which the flap is to be closed.

The spring (1) is deformed at the temperature T1 so that it has the retracted shape corresponding to the opening of the pipe by the flap (7).

When the thermostatic device (4) is placed in a fluid or air current in which the temperature rises, the temperature of the shape memory spring (1) rises and the spring reaches the temperature T2 and elongates by compressing the return spring (2). The movement of the rod assembly (6) brought about makes the flap (7) pivot towards its position for closing the intake pipe (8).

As soon as the temperature of the spring (1) falls below T2, it retracts and the return spring (2) accelerates the shrinkage phenomenon.

In one embodiment variant, the return spring may be a standard traction spring and in this case may be housed inside the shape memory spring (1) and hooked onto the face (31) of the piston (3).

Figure 2:
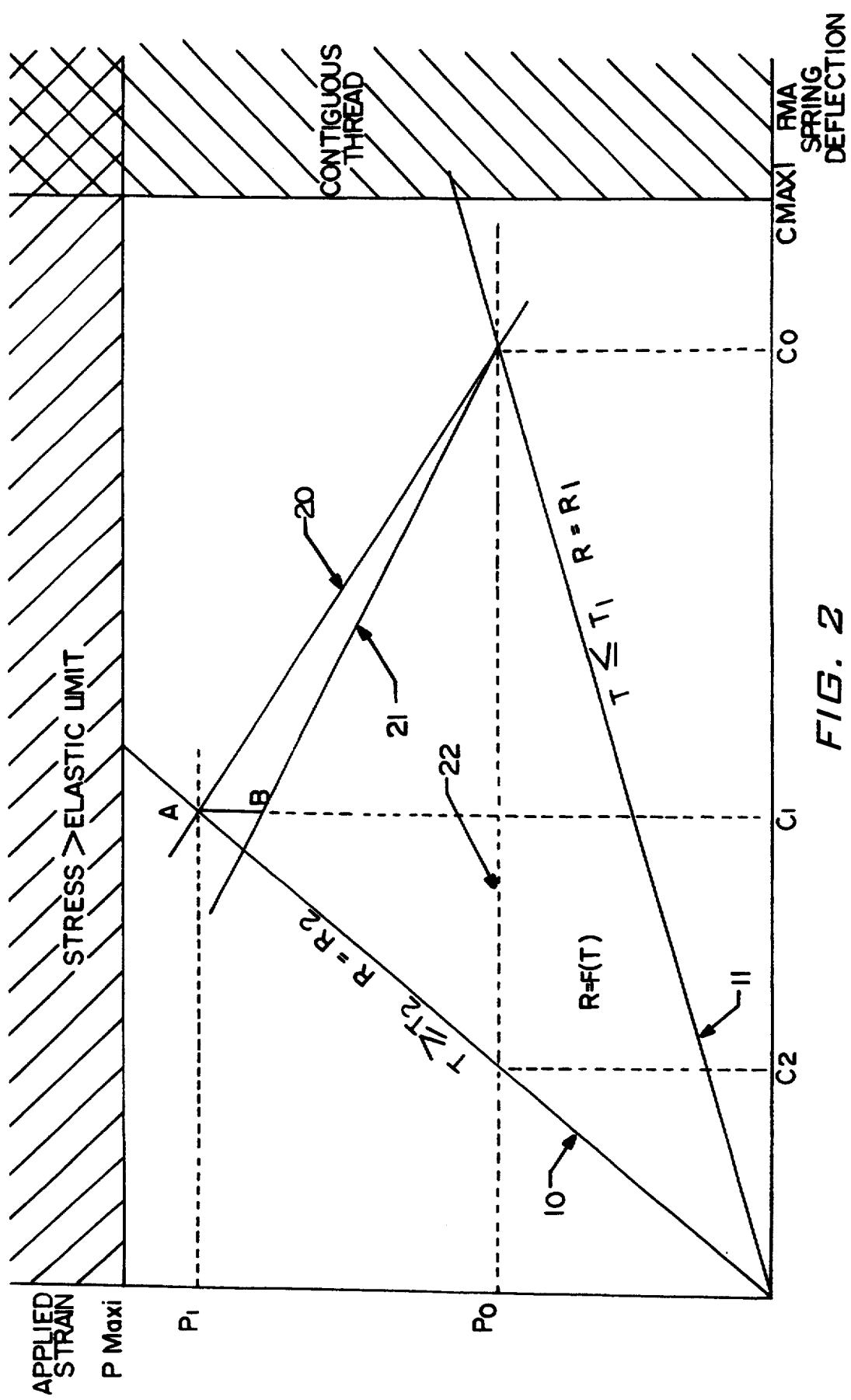
FIG. 2 shows the curves of forces applied for given movements.

The advantage of the thermostatic device shall be more readily understood from a reading of explanations concerning FIG. 2 which represent the forces applied according to the deflection.

Thus, the spring (1) made of a shape memory alloy can be considered as the association of two different springs (R1, R2), the first (R2) represented by the curve

(10) above a temperature T2 and the second R1 by the curve (11) below a temperature T1 with a transition phase from one spring to the other when the temperature varies from T2 to T1 and conversely where $R=F(T)$.

So as to calculate this spring (1), it merely suffices to calculate two different springs, the first having a deflection (C1) under the load (P1) above T2, the second having a deflection (C0) under the load (P0) below T1. The difference C0−C1 is the travel obtained with a force P1 to C1 and a force P0 to C0 within the temperature range T2 to T1.

In the same way for a conventional spring, it is advisable that the spring (R2) does not exceed the maximum admissible stress (P max) of the alloy so as to remain inside the elastic range. As regards the spring (R1), it is advisable that it does not exceed the maximum permissible travel (C max) which is the contiguous coils position of the spring (1).

Within the temperature range T2 to T1, it is thus possible to construct n different thermostats which depend on:

the return spring (20, 21), the preload and the rigidity;
a high temperature stop which may be a simple stoppage of the travel when the curve $R=R2$ is reached or which may be a mechanical stop if it is desired to limit the operating range to a temperature lower than T2. This is the case, for example, with the return spring (21) if the travel is limited to C1;
a low temperature stop T1 which may be a stoppage of the travel when the curve $R=R1$ is reached or even a mechanical stop if it is desired to limit the operating range to a temperature exceeding T1 and even the C max position which corresponds to the contiguous coil spring.

It needs to be noted that the maximum travel (C2 to C0) is defined firstly by the intersection of P0 with R1 and secondly of P0 with R2. This is possible with a return spring (22), this travel able to be approached by the spring (22) known as a super-elastic spring not possessing great rigidity.

In practice, it would be advisable to select a slightly excess dimensioned shape memory alloy spring (1) so as to absorb the friction forces of moving elements and their production tolerances.

Thus, by acting on the characteristics of the spring (1), the return spring (2), the thermostatic cell (41, 40, 30, 31, 5) and the travel of the rod assembly, the operating temperatures of the thermostatic device and the hysteresis are modified. Thus, for example, for a given well with a given travel and an identical spring (1), it is possible to change the operating temperatures by changing the stiffness or rigidity of the return spring.

This shall thus make it possible to adapt the device to usage for an anti-icing function corresponding to an operation within a temperature range of between −20 degrees C. to +20 degrees C. or to a conventional use of the air intake heater corresponding to a range of between +20 degrees C. and 40 degrees C.

As regards the anti-icing function, the device for adjusting the temperature of the air comprises a pneumatic servomotor whose pressure control chamber is directly or indirectly connected to the suction pipe of an internal combustion engine, wherein the mobile element of the servomotor is rendered integral with the well of a thermostatic device for controlling the opening of a flap.

It is possible to carry out modifications without departing from the context of the invention.

We claim:

1. Device suitable for controlling a flap, said device comprising:
    a shape memory alloy spring;
    a return spring;
    a well for housing said shape memory alloy spring and said return spring;
    moveable piston means mounted between said shape memory alloy spring and said return spring in said well;
    a flap;
    connecting means for connecting said piston means to said flap;
    pivotal connecting means for pivotally connecting said flap to said connecting means; and
    well adjustment means for adjusting the dimension of said well, so as to modify the temperature at which the device operates and the hysteresis of the device.

2. Device according to claim 1, wherein said connecting means comprises a rod assembly connected at one end thereof to said piston means and at another end thereof to said flap.

3. Device according to claim 1, wherein said return spring has a rigidity which can be modified so as to adapt the temperature response characteristics of the device.

4. Device according to claim 1, wherein said piston means comprises a first face and a second face opposite said first face, said memory alloy spring acting on said first face, said return spring acting between said second face and a bottom surface of said well.

5. Device according to claim 1, wherein said well adjustment means comprises an adjustable stopper.

* * * * *